(12) United States Patent
Du et al.

(10) Patent No.: US 11,080,166 B2
(45) Date of Patent: Aug. 3, 2021

(54) DATABASE TRACE DEBUGGER

(71) Applicant: SAP SE, Walldorf (DE)

(72) Inventors: Long Du, Xi'an (CN); Yu Wang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/993,841

(22) Filed: May 31, 2018

(65) Prior Publication Data

US 2019/0370148 A1    Dec. 5, 2019

(51) Int. Cl.
| | | |
|---|---|---|
| G06F 9/44 | (2018.01) | |
| G06F 11/36 | (2006.01) | |
| G06F 8/41 | (2018.01) | |
| G06F 16/28 | (2019.01) | |

(52) U.S. Cl.
CPC ............ G06F 11/3636 (2013.01); G06F 8/43 (2013.01); G06F 8/48 (2013.01); G06F 11/3664 (2013.01); *G06F 16/284* (2019.01)

(58) Field of Classification Search
CPC .......... G06F 11/3636; G06F 8/43; G06F 8/48; G06F 11/3664; G06F 16/284
USPC ........................................................ 717/128
See application file for complete search history.

(56) References Cited

U.S. PATENT DOCUMENTS

| | | | |
|---|---|---|---|
| 6,601,233 B1 * | 7/2003 | Underwood .............. | G06F 8/24 717/100 |
| 8,024,299 B2 | 9/2011 | Dias et al. | |
| 8,326,816 B2 | 12/2012 | Colle et al. | |
| 8,442,941 B2 | 5/2013 | Yao et al. | |
| 9,230,242 B2 | 1/2016 | Zhang et al. | |
| 2004/0117413 A1 * | 6/2004 | Brown ...................... | G06F 8/71 |
| 2012/0221513 A1 | 8/2012 | Papadomanolakis et al. | |
| 2015/0234730 A1 * | 8/2015 | Puthuff ............... | G06F 11/3636 717/128 |
| 2016/0179569 A1 * | 6/2016 | Gottschlich ........... | G06F 12/084 711/147 |
| 2018/0121326 A1 | 5/2018 | Qi et al. | |

(Continued)

OTHER PUBLICATIONS

Cantrill, Bryan M., Shapiro, Michael W. and Leventhal, Adam H., "*Dynamic Instrumentation of Production Systems*", General Track: 2004 Usenix Technical Conference, Jun. 27-Jul. 2, 2004; Boston Marriott Copley Place, Boston, MA, USA; 15 pages; DBLP; 2004:15-28.

(Continued)

*Primary Examiner* — Chuck O Kendall
(74) *Attorney, Agent, or Firm* — Fish & Richardson P.C.

(57) ABSTRACT

This disclosure describes a trace debugger (TDB) that is used for database workload replay and database debugging. The TDB maintains consistency through synchronization of the state between the database and a corresponding database trace replay. The TDB can provide a sliding window environment for code block execution and global context sharing. The TDB can be used to interactively analyze and troubleshoot various types of database problems by debugging the database itself, query code (e.g., SQL), performance, end-to-end execution, and plan traces, which can be recorded using scripts. In some implementations, the TDB also provides reverse debugging for historical database state analysis, and/or incremental debugging for dynamic editing and debugging within a session without the need to exit the debugger and perform a full rebuild of the code.

17 Claims, 8 Drawing Sheets

(56) References Cited

U.S. PATENT DOCUMENTS

| | | |
|---|---|---|
| 2018/0143856 A1 | 5/2018 | Du et al. |
| 2018/0146067 A1 | 5/2018 | Du et al. |
| 2018/0146069 A1 | 5/2018 | Du et al. |

OTHER PUBLICATIONS

Chen, Whei-Jen; Mohanraj, Nisanti; Norlen, Hassi; Redbooks; "Getting Started with IBM InfoSphere Optim Workload Reply for DB2" (c) IBM Corp. 2015; 348 pages; retrieved from the Internet May 31, 2018; http://www.redbooks.ibm.com/redbooks/pdfs/sg248221.pdf.
Cheng L., "Spark Replay Debugger Overview" pub. Dec. 3, 2013; Intel Labs China; retrieved from the Internet Jan. 17, 2019; 14 pages; http://spark-replay-debugger-overview.readthedocs.io/en/latest/.
Cicak, Ryan; "How to Analysis or Debug Hive Queries"; Hortonworks.com Sandbox & Learning; retrieved from the Internet Jan. 17, 2019; 7 pages; https://community.hortonworks.com/articles/80293/how-to-analyze-or-debug-hive-queries.html.
Clark S.R., Cobb J., Kapfhammer G.M., et al. "*Localizing SQL Faults in Database Applications[J]*"; Georgia Institute of Technology; ASE 2011; 10 pages; 2011:213-222.
Colle, R., Galanis, L., Supiti B., Stratos P., Wamg U. et al.; "*Oracle Database Replay*"; 4 pages; In VLDB '09, 2009.
Comparison of Debuggers; wikipedia chart; retrieved from the Internet Jan. 17, 2019; 3 pages; https://en.wikipedia.org/w/index.php?title=Comparison_of_debuggers&oldid+865956468.
GDB and Reverse Debugging; "*GBD: The GNU Project Debugger*"; retrieved from the internet May 31, 2018; 2 pages; https://www/gnu.org/software/gdb/news/reversible.html.
GNU Profiler; retrieved from the Internet Jan. 17, 2019; 1 page: https://sourceware.org/binutils/docs-02.16/gprof/.
Gonzalez J., Insa D., Silva J.; "*A New Hybrid Debugging Architecture for Eclipse*"; Springer International Publishing; 19 pages; 2013: 183-201.
Haghdoose A., He W., Fredin J., et al. University of Minnesota; *On the Accuracy and Scalability of Intensive I/O Workload Replay*[C]// USENIX Conference on File and Storage Technologies (FAST '17); USENIX Association, 2017:315-327; 15 pages; ISBN 978-1-931971-36-2.
Honarmand, N., Torrellas, J.; *ReplaxReplay: Record and Replay for Relaxed-Consistency Multiprocessors*[J]; University of Illinois at Urbana-Champaign; ACM Sigplan Notices; 15 pages; 2014, 42(1):223-238.
Kernel Debugger; wikipedia reference; retrieved from the Internet Jan. 17, 2019; 2 pages; https://en.wikipedia.org/w/index.php?title=Kernel_debugger&oldid=854194132.
List of Tools for Static Code Analysis, Wikipedia reference; retrieved from the Internet Jan. 17, 2019; 11 pages; https://en.wikipedia.org/w/index.php?title=List_of_tools_for_static_code_analysis&oldid=878843466.
Memory Debugger; wikipedia chart; retrieved from the Internet Jan. 17, 2019; 3 pages; https://en.wikipedia/org/w/index.php?title+Memory_debuggger&oldid=865956095.
PDB—The Python Debugger; retrieved from the Internet Jun. 6, 2018; 10 pages; https://docs.python.org/3.2/library/pdg.html.
SAP HANA Traces—SAP HANA—SCN Wiki; last modified Jul. 27, 2015; 3 pages; retrieved from the internet May 31, 2018; https://wiki.scn.sap.com/wiki/display/SAPHANA/SAP+HANA+Traces.
Shanqing, C., Breck, E., Nielsen, E., Salib, M., Sculley D., "*Tensorflow Debugger: Debugging Dataflow Graphs for Machine Learnings*"; 30th Conference on Neural Information Processing Systems (NIPS 2016); Barcelona, Spain; 5 pages.
SQL Analyzer Tool; "*dbForge Studio for SQL Server: All-in-One SQL Server GUI Tool*"; retrieved from the Internet Jun. 6, 2018; 4 pages; https://www.devart.com/dbforge/sql/studio/sql-analyzer.html.
SQL Debugger; retrieved from the Internet Jun. 6, 2018; 171 pages; https://docs.microsoft.com/en-us/sql/relational-databases/scripting/transact-sql/debugger.
SQL Server Distributed Replay-Microsoft Docs; last modified Mar. 14, 2017; 4 pages; retrieved from the internet May 31, 2018; https://does.microsoft.com/en-us/sql/tools/distributed-replay/sql-server-distributed-replay.
SQL Server Profiler; Simplyfy SQL Server Management; Quest—Toad ® for SL Server; (c) Quest Software Inc.; 2 pages; retrieved from the internet May 31, 2018; https:www.quest.com/landing/256/?gclid=CiwKCAiwur7YBRA_EiwASXqlHEQUrivowOm21aVinJYRPbH6XZVDOAK2npZ.6v6LijTluMrilEEn2RoCiYeQAvD_Bwe.
SQL Tuning Advisor in Oracle SQL Developer 3.0' retrieved from the Internet Jun. 6, 2018; 6 pages; http://www.oracle.com/webfolder/technetwork/tutorials/obe/db/sqldev/r30/TuningAdvisor.htm.
Using the Rule-Based Optimizer; Oracle9i Database Performance Tuning Guide and Reference; Release 2 (9.2) retrieved from the Internet Jan. 17, 2019; 17 pages; https://docs.oracle.com/dc-B10500_01/servesr.920/a96533/rbo.htm.
Valgrind User Manual; 6. Callgrind: A call-graph generating cache and branch prediction profiling; retrieved from the Internet Jan. 17, 2019; 14 pages; http://valgrind.org/docs/manual/cl-manual.html.
van Kempen, D.; SAP HANA Database interactive Terminal (HDBSQL) by the SAP HANA Academy; SAP Blogs; last modified Mar. 18, 2016; 12 pages; retrieved from the internet May 31, 2018; https://blogs.sap.com/2016/03/18/sap-hana-database-interactive-terminal-hdbsql-by-the-sap-hana-academy/.
Wang, J. Du, S.; "*Consistent Synchronization Schemes for SQL Trace Replay*"; TIP, P&I HANA Data Management; 4 pages; In PVLDB Endowment vol. 4, No. 12, 2011.
Wang, Y., Buranawatanachoke, S., Colle, R., Dias, K., Galanis, L., Papadomanolakis, S., Shaft, U.; "*Real Application Testing with Database Replay*"; 6 pages; In 2009 10.1145/1594156.1594166.

\* cited by examiner

DATABASE TRACE DEBUGGER

BACKGROUND

In software development environments, developers, testers, or other individuals may design, develop, test, build, and deploy software for various purposes. During the development process, an organization may strive to ensure that the software is created and/or delivered substantially free of functional problems (e.g., bugs), performance issues, usability problems, and/or other issues that may prevent the software from functioning as intended, and/or that may cause end-users to not extract the appropriate level of usability, enjoyment, and/or satisfaction from the software. Testing software may include the use of a debugger that steps through code line-by-line, executes code up to a specified breakpoint, and/or otherwise executes the code in a controlled manner, in a test environment, while an operator of the debugger monitors parameter values and/or other aspects of the program state. In some instances, software testing may include testing code that is designed to access and/or update data that is stored in various types of databases.

SUMMARY

Implementations of the present disclosure are generally directed to debugging in a data storage environment. More specifically, implementations are directed to an interactive debugger, the trace debugger (TDB) that provides trace debugging for databases, such as the SAP™ HANA™ database. The TDB can provide support for (e.g., general-purpose and/or major) debugger operations, and also can provide incremental trace debugging and/or reverse trace debugging for databases. In some implementations, the TDB also supports database utilities and/or relative query tools.

In general, innovative aspects of the subject matter described in this specification can be embodied in methods that include operations of: capturing a trace from a production version of a database that operates in a production environment, wherein the trace indicates a state of the database and of a program executing to access the database; executing a trace debugger (TDB) in a test environment that is separate from the production environment; and replaying the captured trace in the TDB to debug the trace in a debugging session while the trace is executing in a test version of the database operating in the test environment.

Implementations can optionally include one or more of the following features: the TDB divides the replayed trace into a plurality of code blocks for divided batch execution; the plurality of code blocks include one or more of an indented code block and a database statement block; the operations further include checking for the one or more indented code blocks in the plurality of code blocks; the operations further include storing for each of the plurality of code blocks, information for the respective code block in a global dictionary that is accessible by the TDB, wherein the stored information includes one or more of a global variable, parameter, function definition, and assignment that is present in the respective code block; the TDB employs one or more of searching and indexing to ensure consistency between the captured trace and the replayed trace; the operations further include receiving a command that is submitted through the TDB to request reverse debugging of the trace, the command indicating a line number in the program that is prior to a current line number; the operations further include in response to receiving the command, restoring the trace to a checkpoint that was previously generated to describe a snapshot of the trace at a point that is proximal to the indicated line number; the operations further include resuming debugging of the trace at the indicated line number, through the TDB; the operations further include receiving at least one edit to code of the program, wherein the at least edit made through the TDB; the operations further include rebuilding the program, within the debugging session, to incorporate the at least one edit, wherein the rebuilding of the program is incremental to rebuild at least one portion of the program that was altered through the at least one edit; and/or the operations further include resuming debugging of the trace, through the TDB, within the debugging session, at a checkpoint that was previously generated to describe a snapshot of the trace at a point that is proximal to current line number of the program.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
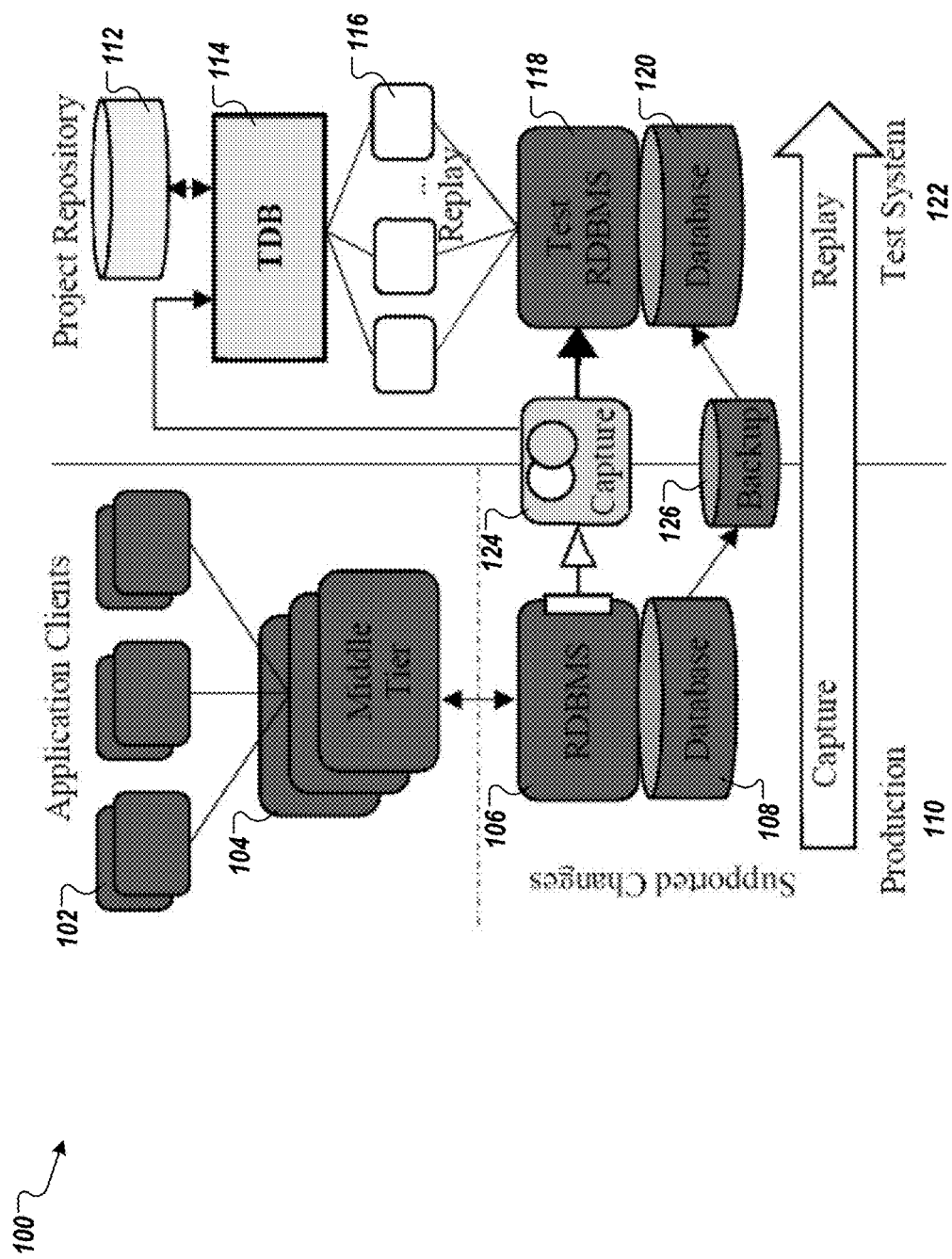
FIG. 1 depicts an example system for database replay-based troubleshooting using TDB, according to implementations of the present disclosure.

Implementations of the present disclosure are directed to systems, methods, computing devices, and/or computer-readable media for database trace debugging. Implementations provide an interactive debugger that provides trace debugging for databases, and that also can provide incremental debugging and/or reversible debugging for database traces. In some examples, the trace debugger (TDB) described herein can be used to debug database traces for the SAP™ HANA™ database. Other suitable databases and/or relational database management systems (RDBMS) can also be supported.

Workload capture and replay in databases is a traditional approach to scenario reproduction and analysis. However, previously available tools present difficulties and/or lack functionality for captured workload inspection, query profiling, and/or other database systems analysis tasks. Implementations provide a technique for workload replay in HANA™ databases, and/or other types of databases, through use of an interactive trace debugger (TDB). TDB maintains consistency by synchronizing the state between the database and trace replay, and also provides a sliding window environment for (e.g., Python™) code block execution and global context sharing. By implementing TDB in this way, implementations can interactively analyze and troubleshoot various types of database problems by debugging the database, structured query language (SQL) and/or other types of queries, database performance, end-to-end functionality, and/or plan traces such as those recorded using Python™ scripts. TDB provides functionality for basic database debugging, as well as reverse debugging for historical database state analysis and incremental debugging for dynamic editing and debugging at the same time. TDB can boost troubleshooting efficiency by handling the complexity between various tools and through use of checkpoints, as described further below.

Database workload capture allows recording of a real workload on a production system with minimal effect on performance. The captured workload includes the requests made on the RDBMS and saved in a trace. Previously available tools for troubleshooting via trace analysis are based on batch processing, which means that the analysis cannot be performed until the end of the replay process, thereby complicating the analysis. TDB overcomes this difficulty by providing real time trace debugging for databases, as described further herein. In some implementations, TDB provides one or more of the following features: list; next, continue; jump forward; snapshot; jump backward; rebuild; breakpoints operation; expression control; shell; and/or languages processing (e.g., search, watch, print, etc.). SQL HDBSQL may be integrated into TDB, SQL query debug may be at least partly supported, and SQL query profile may be available through use of one or more libraries.

Trace replay in the database (e.g., HANA™) helps the test system to run the actual industrial workload, and a complete trace replay process includes the environmental setup, trace process, trace replay, and environment cleanup. Traditionally, any debugging for failures in this process requires a complete restart. These debugging requirements in traditional systems come from SQL or Python™, which requires a hybrid use of PDB, many database tools, and SQL operations, thus making debugging complex and time consuming. Implementations provide a debugger, TDB, to help developers and database administrators by solving these difficulties.

TDB is a high-level, abstract, trace-oriented debugger for database state debugging. Unlike programming language debuggers, TDB handles the complexity between Python™, SQL operations, and database tools for various database problems. Unlike other, previously available, analysis methods based on captured trace and trace replay, where a profiler is used in statistical post-analysis, TDB allows interactive and historical analysis on top of the database. This eliminates a great deal of overhead in scene reproduction and provides for efficient analysis. TDB provides a user-friendly, command line debugging service for interactive and historical analysis when troubleshooting databases such as HANA™.

FIG. 1 depicts an example system 100 for database replay-based troubleshooting using TDB, according to implementations of the present disclosure. As shown in this example, the system can include a production environment 110 and a test system environment 122. The production environment 110 can include one or more application clients 102 that communicate, via a middle tier 104 of software module(s), with a RDBMS 106 that manages a database 108 (e.g., HANA™). The test system environment 122 can include a project repository 112 that communicates with an instance of TDB 114. TDB 114 can create one or more captures traces 116. The test system environment 122 can also include a test version 118 of the RDBMS that runs on the production side, and a test version 120 of the database. A capture component 124 can capture the trace(s) 116 for the TDB 114, and a backup component 126 can backup at least portion of the production database 108 to provide the test database 120.

In some implementations, the trace(s) 116 are captured and provided to the test RDBMS 118. A captured trace 116 can be compiled and replayed using the TDB 114. TDB 114 can be invoked to debug a trace 116 within a session, such as a project or program that is stored in the project repository 112. The captured trace 116 can be replayed, using the TDB 114, and the processed output of the trace 116 is provided to the test RDBMS 118. As used herein, a trace describes a state of the database and/or the replay program, and those state(s) can be captured in a checkpoint as described below. The trace can be expressed using Python™ or any other suitable language. Traces 116 can be captured from the production environment 110 and replayed and debugged in the test system environment 122 using the TDB 114.

In some implementations, TDB operates as a component of a larger trace replay framework provided by an RDBMS. TDB can organize each debugging scenario or session as a project, and each project can be stored in the project repository 112 for session information storage. Scenario/session storage in the repository 112 enables subsequent debugging to reuse the session information, providing greater efficiency than recreating the scenario/session information for each instance of debugging.

TDB implements various debugging operations and provides various functionalities. In some implementations, TDB can implement (e.g., major) debugger operators, which in some instances can share the same functionality as those of programming languages debuggers, but with a different implementation mechanisms. TDB provides various debugging operations as features. These can include, but are not limited to, debugging features such as next, list nearby, breakpoints, watch, continue, jump, and/or expression. TDB also provides reverse debugging and incremental debugging. To reduce overhead during the environment rebuilding and trace replay, TDB supports reverse debugging to improve efficiency. TDB also employs a scheme of incremental debugging to reduce overhead after editing. Reversible debugging enables a user, which in TDB at a particular point in the trace, to edit the trace and then go back to previous checkpoint (e.g., a previous state of the database and code) and replay the trace with the trace changes that were just made, without needing to back out of the TDB and restart. The incremental debugging feature provides an incremental recompile of the trace, which recompiles only the changed portions of the trace. Debugging is then continued with the recompiled trace portions that have been changed, such as the code changes made by the user through the TDB. Both of these features, reversible and incremental debugging, are described further below.

In some implementations, TDB provides a command line interface for executing commands against the database. For example, TDB can integrate with HDBSQL to execute commands against a HANA™ database. TDB also supports functionalities such as query profiling, debugging, and localizing. In some examples, to enhance the user experience and reduce the tool switch overhead, TDB integrates with a suitable shell, such as the Linux™ shell, to provide functions such as editing, system operations and so forth. TDB can also provide utilities such as search, diff, history, and/or other suitable utilities.

Figure 2:
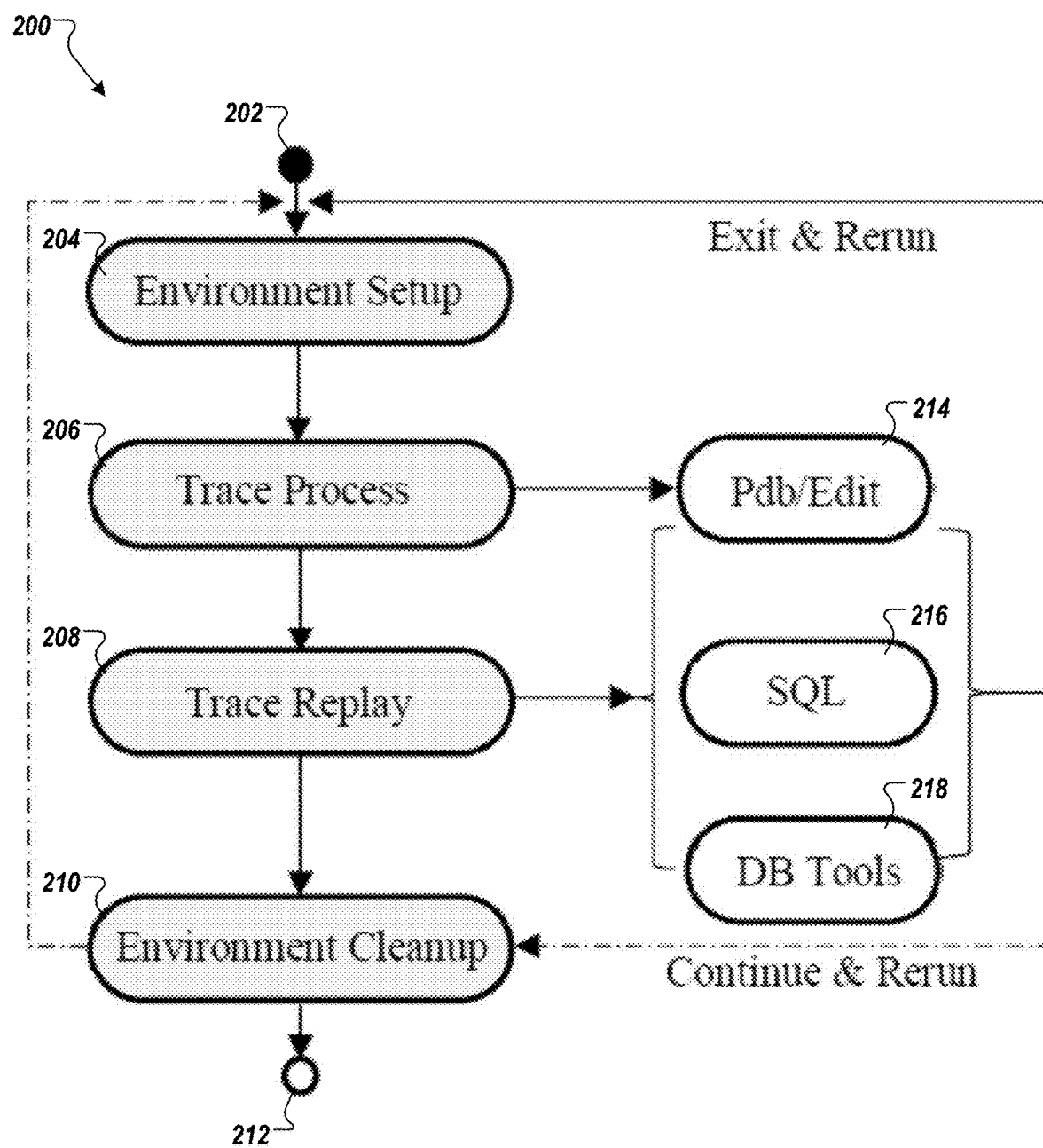
FIG. 2 depicts a flow diagram of a traditional process for troubleshooting in the replay flow.

FIG. 2 depicts a flow diagram 200 of a traditional process for troubleshooting in the replay flow, as provided by previously available solutions.

The process can begin (202), and an environment setup can be performed (204), followed by trace processing (206), trace replay (208), and environment cleanup (210). The process may then return to environment setup (204), or exit (212). Traditionally, the trace replay process can include four parts, as shown in FIG. 2. Failures in the trace processing and trace replay can result in a complete replay rerun, which includes the environment setup (204), trace processing (206), and trace replay (208) up to a particular point in the trace. Traditionally, replay reruns are inconvenient due to their high overhead, and troubleshooting in this process can be complicated. Failures during the replay flow typically require various tools to solve them. For example, trace problems can require a debugger 214 such as the Python™ debugger (PDB) for debugging and trace editing, while database problems can require many SQL operations 216 and/or database tools 218 for identifying and resolving problems. In this traditional scenario, developers must be experienced in handling all these types of issues, but such traditional debugging still remains costly in the number of replay reruns that must be executed.

The TDB, provided by the implementations described herein, addresses the issues discussed above. Using TDB, the environment setup and trace processing are carried out only once. Many functions of the debugger 214 (e.g., PDB), SQL 216, and database tools 218 are implemented in TDB. In addition, TDB enables editing and reprocesses the trace in its debugging session, without requiring an exit form the debugging session. All these features greatly reduce the overhead in replay reruns. In some implementations, TDB differs from other debuggers in that TDB is not designed for a specific language, and can instead target one or more RDBMS such as that of the HANA™ database. TDB supports a mechanism of trace debugging, with reverse and incremental debugging available as features. The running language for TDB is the replay trace. TDB also supports remote debugging, and provides interaction features in soft real time. The trace debugging supported by the TDB is distinct from more traditional methods of stack and/or protocol debugging that are supported by other, previously available debuggers, such as GDB, PDB, the SQL debugger, and so forth.

In some implementations, the captured trace and replay trace in TDB correspond to the programming language's source code and compiled machine code. TDB can use the source code that controls the actual machine code to be executed on the CPU. SQL debuggers are typically implemented with C++ and a user-defined protocol, so their mechanism is identical to that of the programming languages. The programming languages implement their debugger via program stacks and frame control, whereas TDB is implemented via sequential code block execution control. Supported complexity in the TDB can be the result of integration with Python™, SQL, and/or database tooling. Traditional database tools primarily focus on analyzing each SQL statement. Database debugging with TDB focuses on global database validation with SQL statement-level analysis.

Programming languages debuggers like GDB and PDB have relatively high performance, and operate in close to real time. In some implementations, TDB operates in soft real time for database backend data processing consumption. In some implementations, TDB supports reverse and/or incremental debugging, and its performance is improved by ten or a hundred times, compared to that of a normal trace replay, even though TDB operates as a soft real-time process. As used herein, soft real-time refers to a process in which the execution depends on the database execution.

The example formulas below quantify the performance improvement provided by trace replay in TDB. TDB achieves high performance by reducing the overhead of replay rerun, which can be a large source of overhead for database debugging. Example Formulas 1 and 2 below illustrate replay overhead calculation. The replay process can include four parts, as shown in the example of FIG. 2. Any failures in the trace process and trace replay can result in a complete replay rerun. In Formula 1 below, FN refers to failure numbers, and RSO refers to re-setup overhead, which includes the environment's setup including schema import SI, trace compilation $TC_{(O,E)}$ (e.g., from beginning to end), and trace replay E to a specific point I, e.g., $E_{(O,i)}$. Such replay reruns negatively impact performance due to their high overhead.

$$RSO = SI + TC_{(O,E)} + E_{(O,i)} \qquad \text{Example Formula 1}$$

Failures during the replay flow can require different tools to solve them. For example, trace problems can require PDB for debugging and trace editing, while HANA™ problems can require various SQL operations and database tools for identifying and resolving problems. Developers may be experienced in handling these issues, but even so they may be unable to reduce the unnecessary cost that is replay total overhead RTO in replay reruns, as shown in Example Formula 2.

$$RTO \geq FN^*(RSO + SQL + tools) \qquad \text{Example Formula 2}$$

TDB implements various technologies to avoid replay rerun, including basics and utilities (e.g., basic operators), recover (e.g., reverse debugging) as illustrated in Example Formula 3 below, and rebuild (e.g., incremental debugging) as illustrated in Example Formula 4 below. Recover overhead RCO is shown in Example Formula 3. Rebuild overhead RBO is shown in Example Formula 4. An overhead comparison, e.g., RTO versus replay with TDB, is shown in Example Formula 5.

$$RCO=SI+E_{(s,i)}<RSO \quad \text{Example Formula 3}$$

$$RBO=SI+TC_{(s,i)}+E_{(s,i)}<RSO \quad \text{Example Formula 4}$$

$$RTO \geq TTO=FN*(RCO+RBO+basic+utilities) \quad \text{Example Formula 5}$$

Figure 3:
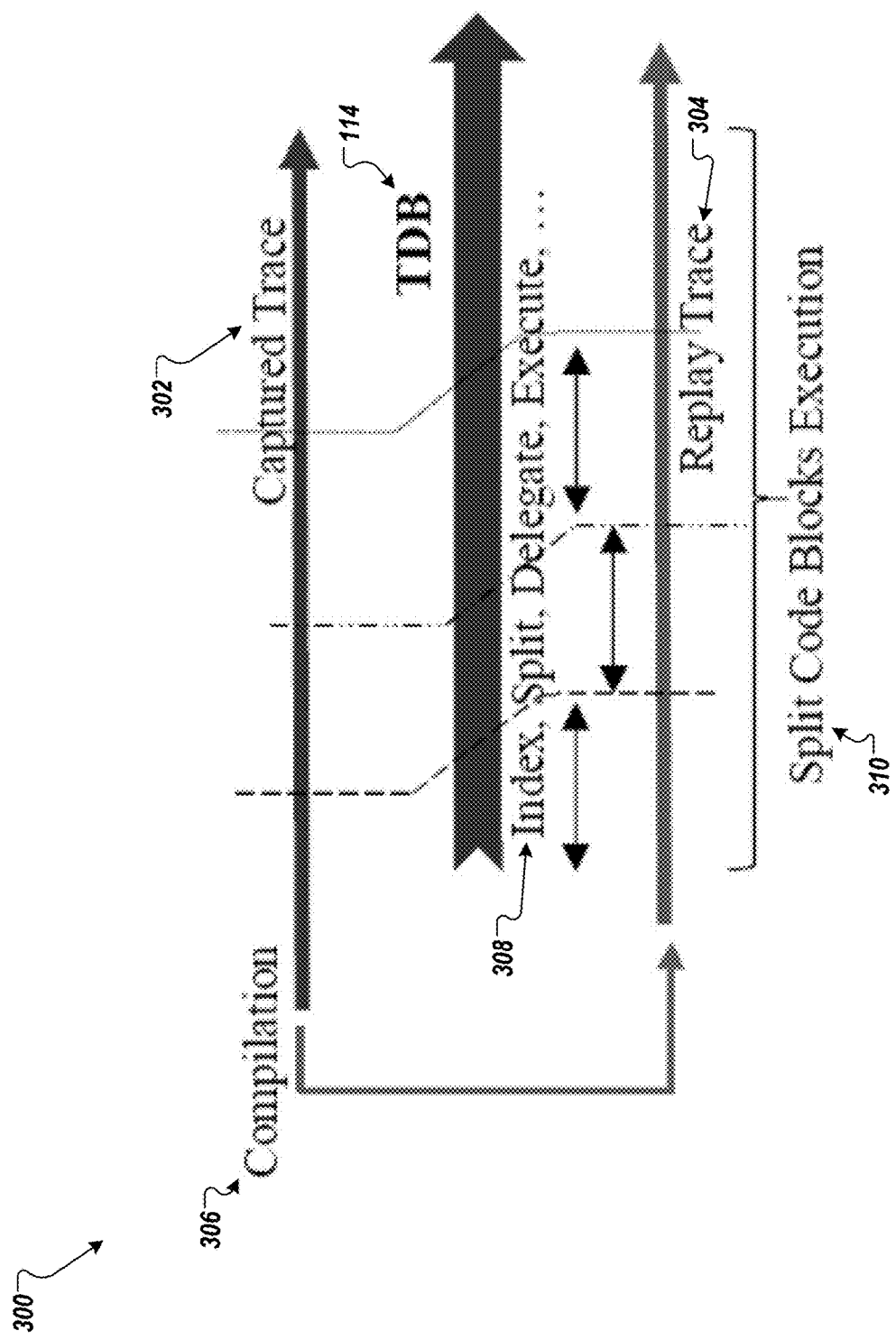
FIG. 3 depicts a schematic showing example TDB architecture and operations, according to implementations of the present disclosure.

FIG. 3 depicts a schematic 300 showing example TDB 114 architecture and operations, according to implementations of the present disclosure. As shown in this example, a captured trace 302 (e.g., a trace 116) can be edited and recompiled (306), then replayed as a replay trace (304) including the edits. TDB 114 can perform various operations 308 such as index, split, delegate, execute, and so forth. Code blocks can be split (310) for execution, as described further below.

In some implementations, TDB handles the complexity between the original captured trace and replay trace, as depicted in FIG. 3. In some instances, the original captured trace can be executed directly, but in other instances this may be insufficient to analyze issues such as query result validation, expensive statements profiling, and/or query ordering. Accordingly, a trace replay framework can carry out code injection to the captured trace for such analyses. In some implementations, TDB uses the SQL trace as its initial trace format, and is also compatible with other traces.

In some implementations, TDB employs a sliding window mechanism for (e.g., Python™) code block dynamic split, to provide consistency between the replay program and the (e.g., HANA™) database. TDB can work as a delegator and controller for the real workload replay, which takes control of script code block splitting, statement indexing, and searching from the captured trace to the replay trace. Moreover, TDB can delegate the code blocks for execution, manage the synchronization between databases and traces, and address many utility issues for usability.

In some implementations, TDB employs code block splitting. TDB can divide the replay trace into code blocks for divided batch execution, so that various debugger operations are implemented with relative code block execution. TDB functionalities and/or operators can be implemented with code blocks execution, but with different execution methods. For example, 'next' can indicate a code block execution of one line, 'jump [#]' can indicate a code block execution until reaching the line number [#], and 'continue' can indicate code block execution to the end. The code blocks in the workload replay can include the indented (e.g., Python™) code block and database statement block. Improper code block splitting can result in execution error or confusion. There can be many indented code blocks (e.g., Python™ blocks) in the replay trace. The splitting can check whether the code is indented, or at the beginning of a code block. TDB can cache the (e.g., Python™) code block and execute it until the code block is finished.

A (e.g., Python™) code block sometimes belongs to a database statement block. Database statement code blocks can include SQL statements, relative result sets for queries, connection information, and/or injected (e.g., Python™) code. Each database statement can be divided into a code block. For example, code blocks can include indented Python™ code block(s), and original Python™ and/or database statement block(s). The indented Python™ code block can be newly inserted after the trace compilation for further analysis. The original code block can be modified and/or fixed for various reasons.

In some implementations, TDB provides global context sharing. Any suitable number of variables and/or parameters can be shared across the executable replay trace, and executing code blocks can lead to error from the loss of definition of variables and/or parameters. To solve this problem, TDB can employ a global context sharing dictionary for continuous code block execution. For each code block, all global variables, parameters, function definitions and assignments can be saved in the global dictionary. The execution function can also be modified to reference the global dictionary for the context sharing in each code block.

In some implementations, TDB provides searching and/or indexing functionality. The replay trace can become inconsistent with the captured trace after code injection. TDB can employ indexing and searching to ensure consistency between the replay trace and captured trace. TDB can execute statements in the replay trace sequentially as ordered timestamps. For identical lines, TDB can analyze the context, thread ID, connection ID, and timestamp. In this way, TDB can index each database connection definition statement and indented (e.g., Python™) code block for further processing. The lines in the replay trace can be modified by a replay framework, for example using a user password or user name. TDB can handle the line searching by modifying the search content, where the information is extracted from the trace.

In some instances, the traces and database are still not consistent if reverse debugging is triggered or developers perform operations that change the database state. In some implementations, TDB provides a recover and calibration mechanism (e.g., between TDB and HANA™) to address this issue. To ensure consistency between TDB and the replay framework, TDB can also synchronize the function and variable states before and after the debugging process.

With regard to usability, TDB can also handle many management issues like database connection handling, query format, third party package import/export, and configuration. TDB can manage debugging sessions through building projects, which can include configuring files for setup, cleanup, skip patterns, trace and data paths. Such static configurations can be preloaded when TDB starts a new debugging session, while other dynamic configurations can be set with set statements during the TDB debugging session.

In some implementations, TDB also implements and integrates other functionalities to provide a more feature-rich, integrated debugging environment. For example, advanced functionalities like text searching, expression control, and variable monitoring can be supported. With the global dictionary built for code block execution, TDB can also watch for variable changes by watching the dictionary during execution. TDB's print operator can support variable watching and printing, and also allow text searching forward and backward. TDB can also support a diff function to identify differences between traces. Expression control can also be supported via an expression parser provided by TDB.

In some implementations, TDB integrates a shell, such as the Linux™ shell, by adding a "!" character or the word "shell" ahead of the command to indicate that the command is to be executed in the shell. To provide a more human-readable text format, TDB can collect SQL keywords and programming language (e.g., Python™) grammar rules for colorized text, such that grammar errors and/or TDB-managed keywords can be highlighted for debugging. An example of basic TDB usage (e.g., as might be shown in the command-line interface of TDB) is illustrated in Example Code 1.

Example Code 1

```
(tdb) help
    usage list ...
(tdb) n
    #con info [con-id 234234, tx-id 169, ...]
(tdb) ns
    cursor_324337277387923_c15321.execute ( ... ...
(tdb) b 3500
    breakpoint set. ( 3500: 1212327)
(tdb) con
    continue running...
    executed from 471 to 1212328
(tdb) jump 8000
    executed from 1212328 to 4721872
(tdb) sql
    SELECT DISTINCT "SGS_STRUC_NAME", "BO_TYPE"
FROM "BA1/TB6_BO_CUST" WHERE "CLIENT" = ' 821 "
(tdb) hdbsql select * from dummy
    DUMMY
    "X"
    1 row selected (overall time 14621 usec; server time 146 usec )
(qdb) sql_procedure
    ...
(tdb) watch cursor_14017277387923_c35820
    watchdog set. {cursor_14017277387923_c35820}
(tdb) p cursor_14017277387923_c35820
    Cursor_14017277387923_c35820 = con...
(tdb) history
    executed commands list...
```

In some instances, in the process of debugging a database, various database operations (e.g., in HANA™) may need to be performed to analyze identified problems. Thus, TDB can integrates a database interactive terminal, such as HDBSQL, to enable performance of database operations. Two types of terminal connections can be provided: a first connection for the system user for system level operations, and a second connection for the user specified in the captured trace for trace-level operations.

In some implementations, TDB provides features for query validation. Databases and applications typically try to ensure that each query can be executed and returned with the expected result set. In addition, the execution times for each query on the server side and on the network may also be evaluated for performance considerations. In some examples, the workload replay framework implements the query validation functions. TDB provides a mechanism for additional validation of each query after various operations. TDB's default constructor can share specific functions with the workload replay framework via the object reference. The captured trace and replay trace contents can also be transmitted in this way. The query validation can compare the result set in the captured trace with the result set returned from the test instance. In some implementations, TDB employs a merge-sort algorithm to perform the comparison. TDB can also measure the query execution time to help developers evaluate the system performance.

In some instances, SQL statements in the trace are not user friendly for parameterized query or dynamic SQL. Accordingly, TDB can provide a query normalizer to convert parameterized queries in traces to more human-readable queries. For example, using HDBSQL developers can troubleshoot HANA™ problems directly in TDB. In addition, TDB can also support parsing, splitting, and formatting for query analysis.

In some instances, the most common problems in databases arise from query performance-related issues. In some implementations, TDB records SQL statement execution statistics such as the SQL history list, execution time, and plan report, to help address such problems. In addition, TDB can implement a query tuning advisor as a profiling guide. This may be based on rules for SQL grammar tuning. Default rules in the tuning advisor can be collected and written according to the developer's experience and understanding of the database (e.g., HANA™) architecture.

As with dynamic tracing, a database query profiler may not always be sufficient for developers to adequately troubleshoot query performance problems. Thus, developers and database administrators may still require a query debugger for detailed debugging of queries and stored procedures. Accordingly, TDB can provide a query debugger client to interact with the database (e.g., HANA™) query debugger server. TDB can switch modes from TDB to query debugger (QDB) for query and stored procedure debugging. The query debugger in TDB supports breakpoints, variable watch, continue running, jump execution, call stack, and/or other debugger functionalities.

In some implementations, TDB provides for checkpoint generation and storage (e.g., checkpointing) to generate and store checkpoints that each describes a current state of the database and execution code. The checkpoints can be used in reversible and incremental debugging as described below. In some implementations, the checkpoints are stored in the project repository. Checkpoints can be generated periodically (e.g., every 20 or 30 seconds), and/or every N lines of code. The frequency of the checkpointing can be adjusted for performance tuning. For example, too frequent checkpointing can degrade the performance of TDB in certain computing environments.

In some implementations, TDB provides a checkpoint command operator for developers to create snapshots of the database and replay trace. This can facilitate further recover or rebuild operations. Example Code 2 provides an example of the checkpoint command operator usage through TDB (e.g., as might be shown in the command-line interface of TDB).

Example Code 2

```
(tdb) where
    lddf5a_sql_trace_whiltelisting.py line 3500
(tdb) checkpoint
    0 rows affected (overall time 13.932161 sec; server time 13.918030 sec)
    program serialized.
    schema snapshot exported to /data/tdbSnapshot/SAPF5A/3500
(tdb) !ls /data/tdbSnapshot/SAPF5A
    0  3500
```

Figure 4:
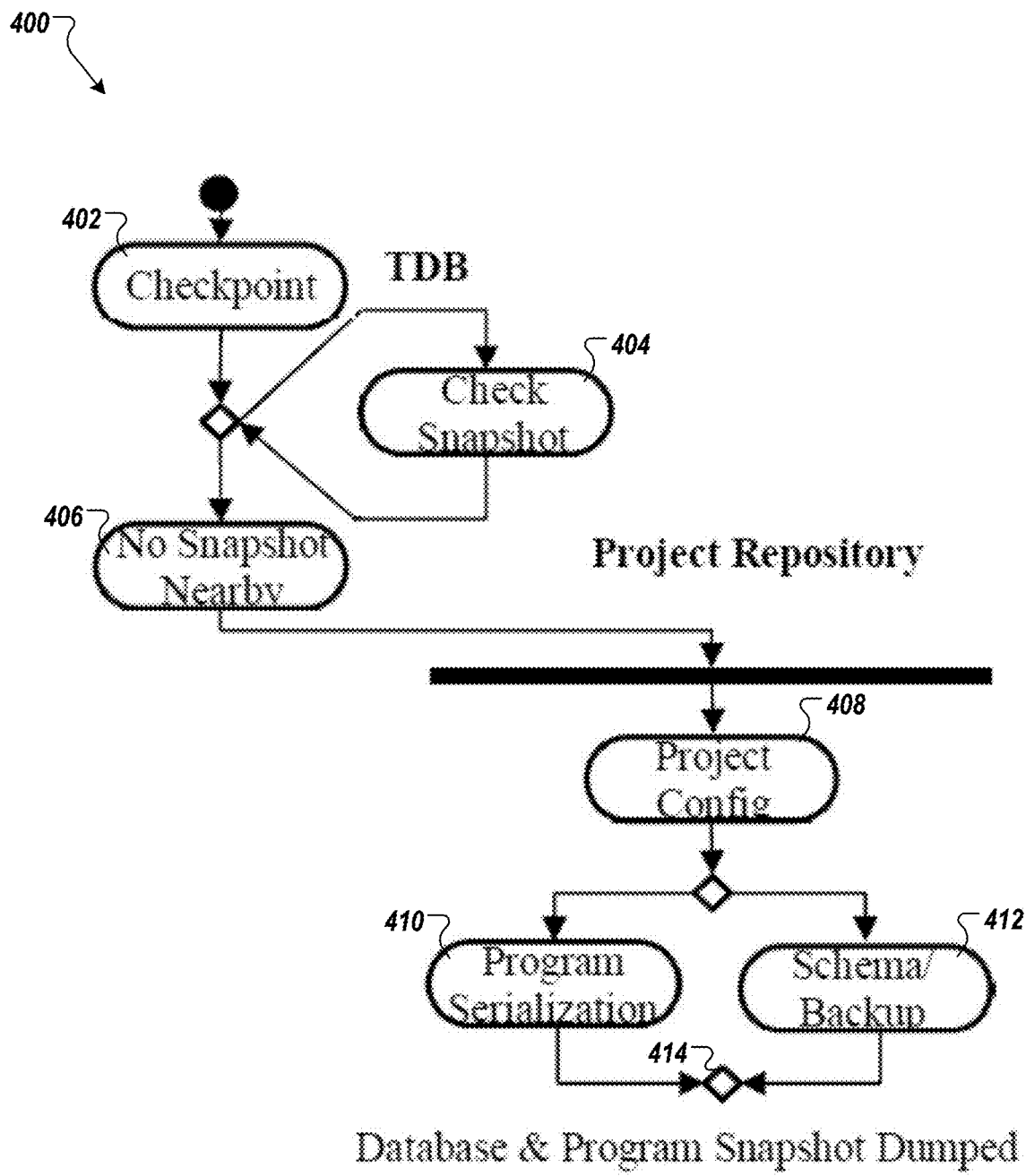
FIG. 4 depicts a flow diagram of an example process for checkpoint and/or snapshot generation control flow, according to implementations of the present disclosure.

FIG. 4 depicts a flow diagram 400 of an example process for checkpoint and/or snapshot generation control flow, according to implementations of the present disclosure. Snapshot and checkpoint are used herein interchangeably, and each can refer to a saved state of the database and/or application accessing the database. A request to generation a checkpoint can be received (402) through the TDB. TDB can check (404) whether there is a snapshot already saved (e.g., in the project repository) that is sufficiently near to the requested checkpoint. If there is no nearby snapshot (406), the process accesses the projection configuration (408) and employs the program serialization (410) and/or schema/backup (412) to generate a snapshot (414) of the database and/or program code, which can be saved (e.g., dumped) to the project repository.

In some implementations, a reverse debugging request can find the latest snapshot for state recovery, providing a tradeoff of less recovery time at the cost of more disk space used. At the start of debugging, an initial snapshot can also be generated and stored by TDB automatically. Subsequent debugging may not this initial snapshot, but may reuse it for more efficient processing.

TDB's replay trace snapshot can be more complex compared with the data snapshot, which can include database connections and database cursors for SQL operation, as well as other (e.g., Python™) language functions and/or variables. TDB can generate the program snapshot of running the replay trace through dumping of the global dictionary. As discussed above, TDB can implement code block execution via a global dictionary, which records all variables, classes, modules, and functions in a code block. Thus, this global dictionary also represents the program's state. TDB serializes this global dictionary to the same directory where the database snapshot is stored. In some instances, at least some database connections and cursor object information are not fully serialized due to their dependencies, such as dependent connection settings, or relative statement's result sets.

Figure 5:
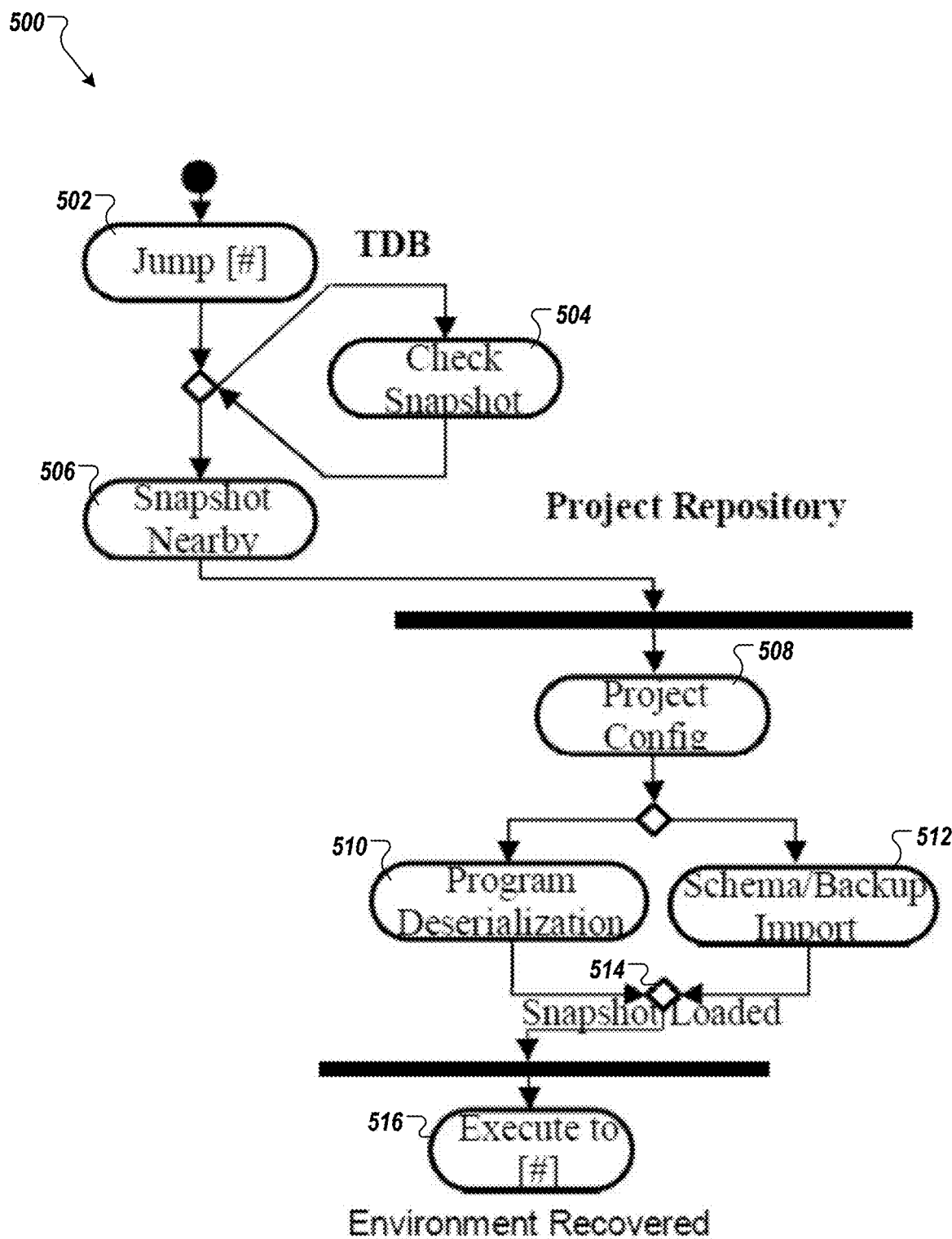
FIG. 5 depicts a flow diagram of an example process for recovery with jump back control flow, according to implementations of the present disclosure.

TDB significantly reduces the overhead and performance losses involved with reverse debugging by using the most recent snapshot recovery instead of setting up the whole environment again. This can result in at least a tenfold performance improvement. Sometimes, developers go too far in the process of debugging. Thus, it is possible to jump back to any previous state using the TDB's jump operator. Entering a line number lower than current one will trigger such debugging state recovery, as shown in the example of FIG. 5.

As with the manually dumped snapshot generated by TDB, TDB can find the most recent snapshot to recover. TDB can reestablish the debugging environment and recovers data to replace the original data. In some examples, TDB's replay trace program recovers via rebuilding the original global dictionary. TDB may not reserialize the original dictionary snapshot directly, given that the deserialization of objects can result in low performance, and implementations attempt to keep the running sequence as close to the original as possible. Thus, the replay trace can be rerun without executing a substantial program entity. Instead, TDB may execute definition statements, and may remove some global dictionary items when certain variables are no longer required. After the trace is rerun, the global dictionary can be reestablished. In some implementations, TDB can load the original dictionary snapshot to supplement one or more variables or object states, such as cursor execution result sets or trace global variables. TDB's replay trace recovery can be performed with minimal cost by applying replay trace rerunning and dictionary deserialization simultaneously.

After trace and data recovery, the checkpoint context is fully recovered. Then, TDB can execute the trace until the appropriate execution point is reached. In the process of reverse debugging, the performance is not always stable if a proper checkpoint is not provided. Thus, developers be prompted to dump the checkpoint as appropriate in some instances. TDB can also limit the checkpoint frequency, such that checkpoints are not saved too close to one another. For example, every 100,000 lines in the replay trace can prompt the generation of a checkpoint. Example Code 3 provides an example of jump back operation through TDB (e.g., as might be shown in the command-line interface of TDB).

---

Example Code 3

(tdb) where
   lddf5a_sql_trace_whiltelisting.py line 8000
(tdb) !ls /data/tdbSnapshot/SAPF5A
   0   3500
(tdb) jump 3700
   0 rows affected (overall time 394.475 msec; server time 280.911 msec)
   0 rows affected (overall time 25.932 msec; server time 13.918 msec)
   0 rows affected (overall time 9195.932 msec; server time 9113.918 msec)
   schema snapshot imported to /data/tdbSnapshot/SAPF5A/3500
   program executed from 1133665 to 1225972
   ...
-->#  ResultSet.row[315]⁻ ...
...

---

FIG. 5 depicts a flow diagram 500 of an example process for recovery with jump back control flow, according to implementations of the present disclosure. A request to jump to a line number (e.g., "#") can be received (502) through the TDB. TDB can check (504) whether there is a snapshot already saved (e.g., in the project repository) that is sufficiently near to the requested jump back point. If there is a nearby snapshot (506), the process accesses the projection configuration (508) and employs the program serialization (510) and/or schema/backup (512) to load the snapshot (514) of the database and/or program code from the project repository. The trace can be executed (516) to the requested line number, and the environment can be recovered.

Figures 6A, 6B:
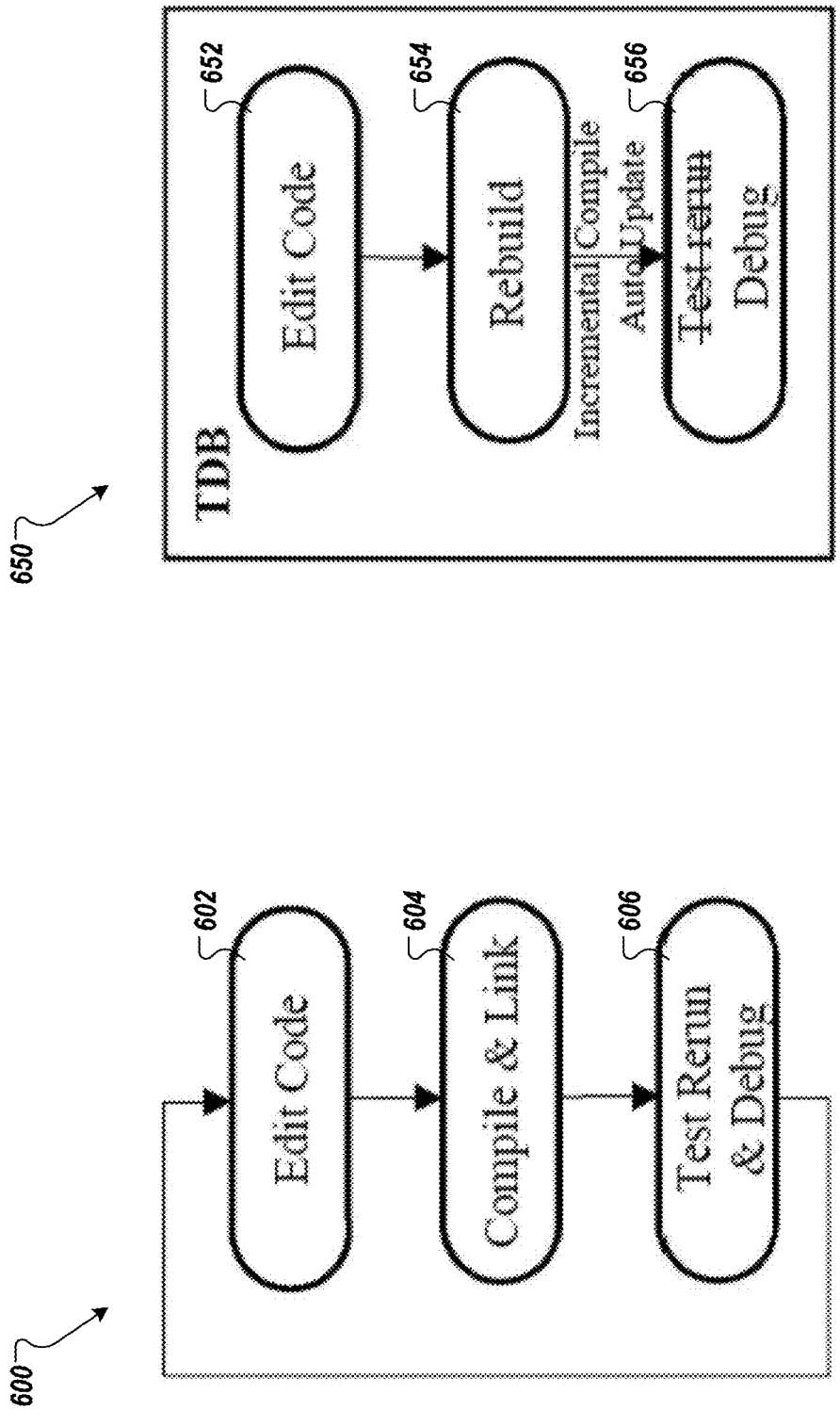
FIG. 6A depicts a flow diagram of a traditional debugging process.
FIG. 6B depicts a flow diagram of an example process for incremental debugging using the TDB, according to implementations of the present disclosure.

FIG. 6A depicts a flow diagram 600 of a traditional debugging process. In this traditional process, code is edited (602), the edited code is compiled and linked (604), and the test is rerun and debugged (606), requiring a re-execution of the debugging environment. In other words, edits to the code require an exit from the debugger, a rebuild of the edited code, and a rerunning of the test in a subsequent debugger execution.

In contrast to this traditional method of debugging, TDB provides incremental debugging in which code can be edited and incrementally rebuilt within the debugger, and execution can be continued without the need to exit the debugger.

FIG. 6B depicts a flow diagram 650 of an example process for incremental debugging using the TDB, according to implementations of the present disclosure. In this process, the code is edited (652) and rebuilt (654) to compile and/or link the changed portions of the code (e.g., incremental compile), the incrementally rebuilt code is auto-updated and debugging continues (656) without exiting TDB.

Incremental debugging in TDB greatly reduces overhead through automatic incremental trace compilation after editing, and through recovery using the most recent snapshot. A traditional debugging process is not fully completed in the debugger. Instead, traditional debugging is an iterative process as shown in FIG. 6A. Once a bug is identified, the developer needs to edit the code, and then compile and link the edited code, prior to rerunning the code in the debugger. Thus, any newly identified problems may require another iteration of the debugging process for problem troubleshooting. Example Code 4 provides an example of a rebuild operation through TDB (e.g., as might be shown in the command-line interface of TDB).

Example Code 4

```
(tdb) where
    lddf5a_sql_trace_whiltelisting.py line 10000
(tdb) !vi lddf5a_sql_trace_whilteliating.py
    lddf5a_sql_trace_whiltelisting.py line 10000
(tdb) !ls / data/tdbSnapshot/SAPF5A
    0    3500    8000
(tdb) rebuild 4000
processing trace took 6.1898298384 seconds
+-----------------------------------------------------------------------
Retrieving sql trace result stat
Total sql statement 348, skipped lines 0, percentage is 0.00%
skipped details: pattern ignore: 0, column parse error: 0, record parse
  error: 0
Column parse error detail: unsupported type 0, syntax error 0
+-----------------------------------------------------------------------
    replay trace updated.
    0 rows affected (overall time 294.475 msec; server time 283.103 msec)
    0 rows affected (overall time 22.912 msec; server time 21.218 msec)
    0 rows affected (overall time 9195.932 msec; server time 9113.918
        msec)
    schema snapshot imported to /data/tdbSnapshot/SAPF5A/3500
    program executed from 1133665 to 1385174
    ...
-->#  ResultSet.row[399] = ...
    ...
```

In some implementations, TDB makes debugging an interactive process via enabling code editing in the debugging environment, and rebuilding with incremental compiling and automatic environment updates. This eliminates the process of test rerunning and tool-switch overhead, as shown in the example of FIG. 6A. TDB can also integrates a shell and/or editor functions such as word search, text diff comparison, and/or line locate.

Figure 7:
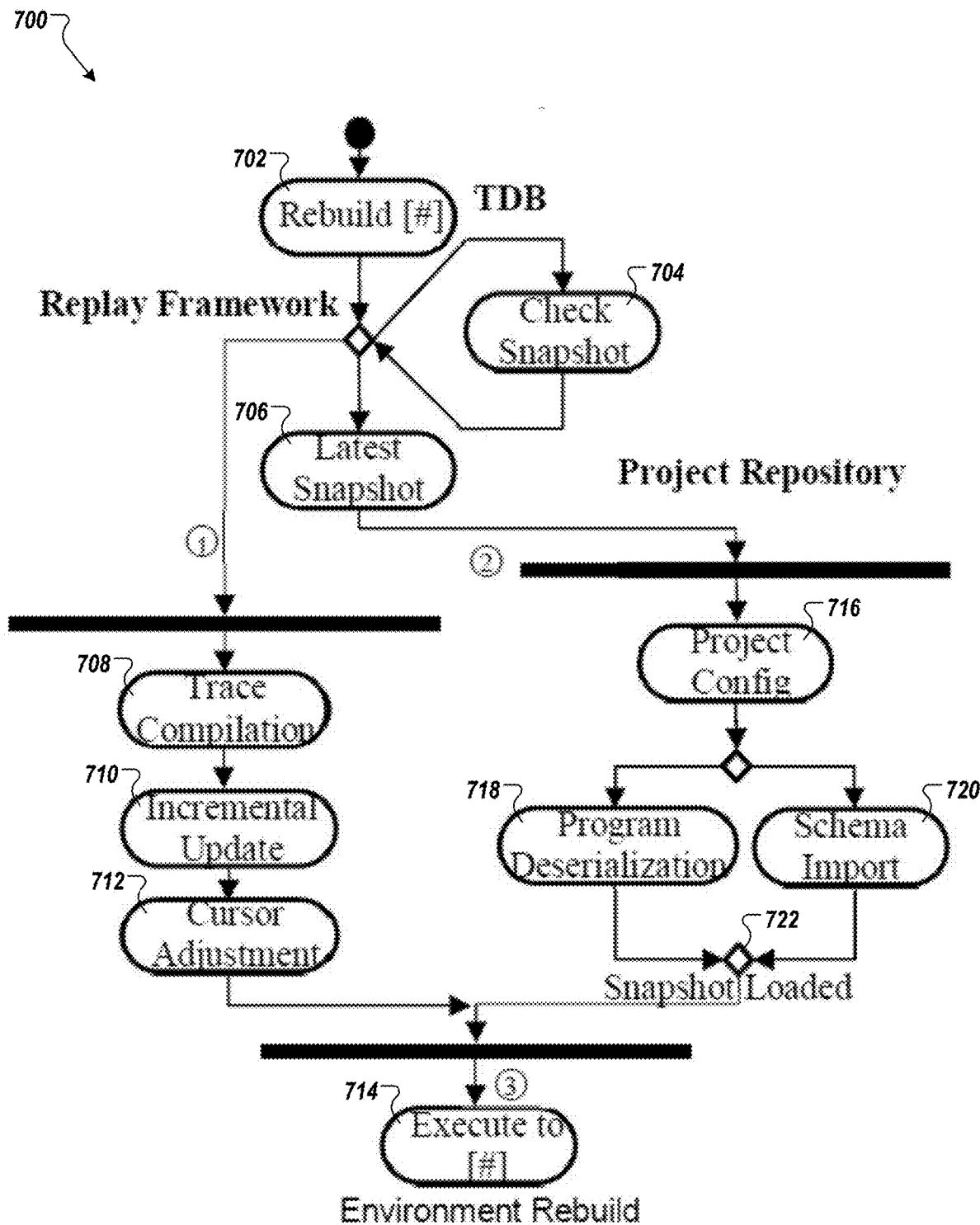
FIG. 7 depicts a flow diagram of an example process for environment rebuild, according to implementations of the present disclosure.

After editing the source code with its captured trace, the original debugging process can become chaotic in the context of running the programs controlled by TDB. Therefore, TDB can provides functionality for an immediate update to the context of running program, with the "rebuild [line number]" operator. The control flow for this operator is shown in FIG. 7. The debugger can carry out incremental compilation of source code after the code line number, and the updated program is restored to the code line number.

FIG. 7 depicts a flow diagram 700 of an example process for environment rebuild, according to implementations of the present disclosure. A request (702) to rebuild at a line number (e.g., "#") can be received through the TDB. TDB can check (704) whether there is a snapshot already saved (e.g., in the project repository) that is sufficiently near to the requested rebuild point. Trace compilation (708) is performed, the incremental update (710) is generated, and the cursor adjustment (712) is provided. The environment can be rebuilt (714) and execution can proceed at the indicated line number.

If there is a nearby snapshot already (706), the process accesses the projection configuration (716) and employs the program serialization (718) and/or schema/backup (720) to load the snapshot (722) of the database and/or program code from the project repository. The environment can then be rebuilt (714) and execution can proceed at the indicated line number.

After the compilation, the incremental updated trace content for the captured trace and replay trace can be updated immediately in the TDB environment. In some implementations, TDB reuses its reverse debugging component to restore its updated context. Here, TDB reuses its checkpoint for the most recent snapshot recover, which restores the database schema and running replay program context simultaneously, followed by re-executing the program to the specified line number for total debugging environment reestablishment.

Alternatively, if the "rebuild" operator is provided without a line number, TDB can adjust the line cursor with the updated context in the captured trace and replay trace, without restoring any snapshots. This can be efficient but can also be limited in terms of trace editing for the annotated lines, given that much important information in the trace can be stored as annotated lines, and editing these contents may not change the program's symbol table.

Figure 8:
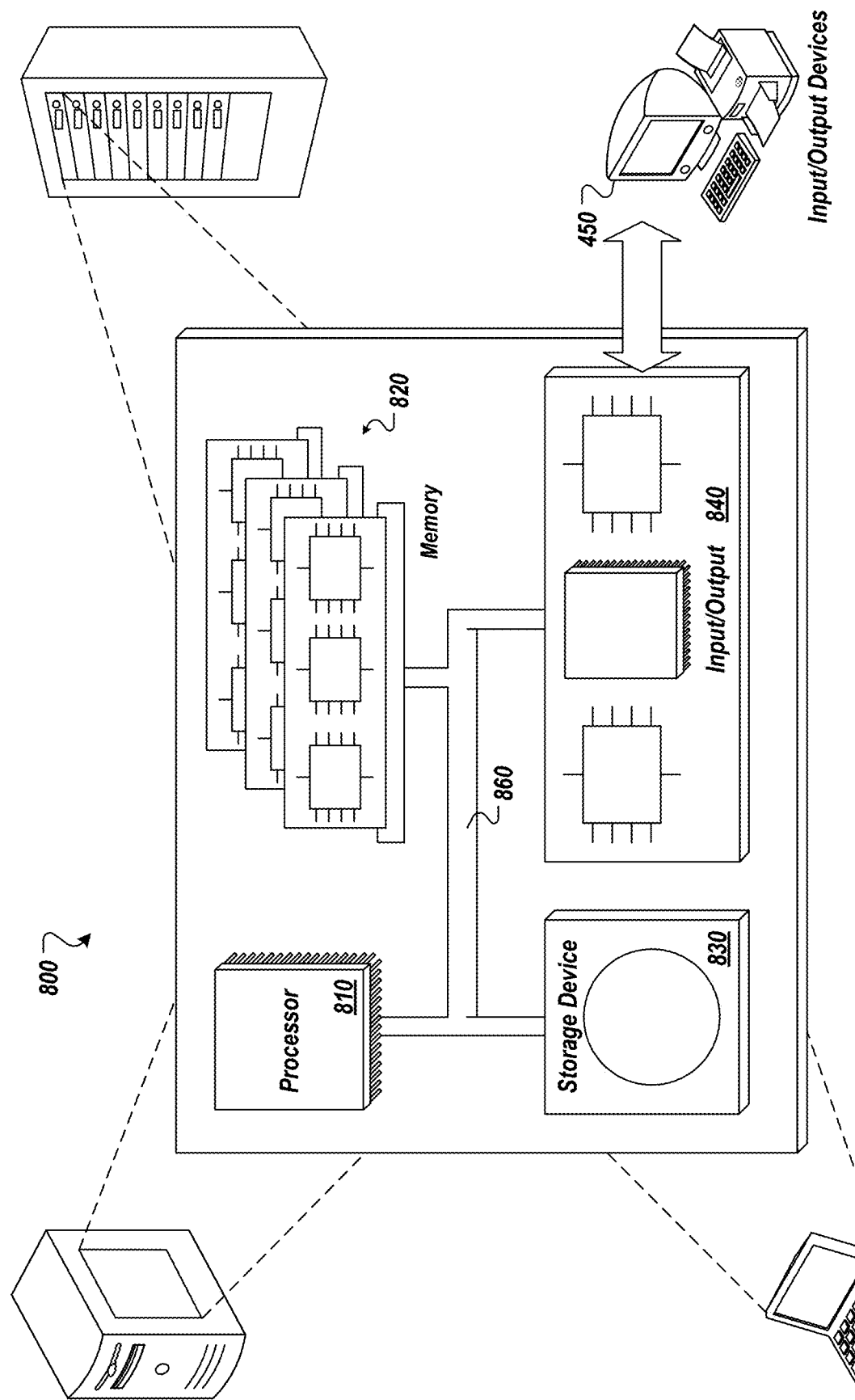
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. For example, the system 800 may be included, at least in part, in one or more computing devices that host the production environment 110 and/or the test system environment 122, and/or other computing device(s) or system(s) described herein. The system 800 may include one or more processors 810, a memory 820, one or more storage devices 830, and one or more input/output (I/O) devices 850 controllable through one or more I/O interfaces 840. The various components 810, 820, 830, 840, or 850 may be interconnected through at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
capturing, by the at least one processor, a trace from a production version of a database that operates in a production environment, wherein the trace is a log that indicates a state of the database and of a program executing to access the database, wherein the state is a recording of variables, classes, modules, and functions in a code block;
executing, by the at least one processor, a trace debugger (TDB) in a test environment that is separate from the production environment;
replaying, by the at least one processor, the captured trace in the TDB to debug the trace in a debugging session while the trace is executing in a test version of the database operating in the test environment;
receiving, by the at least one processor, at least one edit to code of the program, the at least one edit made through the TDB;
rebuilding, by the at least one processor, the program, within the debugging session, to incorporate the at least one edit, wherein the rebuilding of the program is incremental to rebuild at least one portion of the program that was altered through the at least one edit; and
resuming, by the at least one processor, debugging of the trace, through the TDB, within the debugging session, at a checkpoint that was previously generated to describe a snapshot of the trace at a point that is proximal to current line number of the program.

2. The method of claim 1, wherein:
the TDB divides the replayed trace into a plurality of code blocks for divided batch execution; and
the plurality of code blocks include one or more of an indented code block and a database statement block.

3. The method of claim 2, further comprising:
checking, by the at least one processor, for the one or more indented code blocks in the plurality of code blocks.

4. The method of claim 2, further comprising:
storing, by the at least one processor, for each of the plurality of code blocks, information for the respective code block in a global dictionary that is accessible by the TDB, wherein the stored information includes one or more of a global variable, parameter, function definition, and assignment that is present in the respective code block.

5. The method of claim 1, wherein the TDB employs one or more of searching and indexing to ensure consistency between the captured trace and the replayed trace.

6. The method of claim 1, further comprising:
receiving, by the at least one processor, a command that is submitted through the TDB to request reverse debugging of the trace, the command indicating a line number in the program that is prior to a current line number;
in response to receiving the command, restoring, by the at least one processor, the trace to a checkpoint that was previously generated to describe a snapshot of the trace at a point that is proximal to the indicated line number; and
resuming, by the at least one processor, debugging of the trace at the indicated line number, through the TDB.

7. A computer system, comprising:
at least one processor; and
a non-transitory memory communicatively coupled to the at least one processor, the memory storing instructions which, when executed by the at least one processor, cause the at least one processor to perform operations comprising:
capturing a trace from a production version of a database that operates in a production environment, wherein the trace is a log that indicates a state of the database and of a program executing to access the database, wherein the state is a recording of variables, classes, modules, and functions in a code block;
executing a trace debugger (TDB) in a test environment that is separate from the production environment;
replaying the captured trace in the TDB to debug the trace in a debugging session while the trace is executing in a test version of the database operating in the test environment;
receiving, by the at least one processor, at least one edit to code of the program, the at least one edit made through the TDB;
rebuilding, by the at least one processor, the program, within the debugging session, to incorporate the at least one edit, wherein the rebuilding of the program is incremental to rebuild at least one portion of the program that was altered through the at least one edit; and
resuming, by the at least one processor, debugging of the trace, through the TDB, within the debugging session, at a checkpoint that was previously generated to describe a snapshot of the trace at a point that is proximal to current line number of the program.

8. The computer system of claim 7, wherein:
the TDB divides the replayed trace into a plurality of code blocks for divided batch execution; and
the plurality of code blocks include one or more of an indented code block and a database statement block.

9. The computer system of claim 8, the operations further comprising:
checking for the one or more indented code blocks in the plurality of code blocks.

10. The computer system of claim 8, the operations further comprising:
storing for each of the plurality of code blocks, information for the respective code block in a global dictionary that is accessible by the TDB, wherein the stored information includes one or more of a global variable, parameter, function definition, and assignment that is present in the respective code block.

11. The computer system of claim 7, wherein the TDB employs one or more of searching and indexing to ensure consistency between the captured trace and the replayed trace.

12. The computer system of claim 7, the operations further comprising:
receiving a command that is submitted through the TDB to request reverse debugging of the trace, the command indicating a line number in the program that is prior to a current line number;
in response to receiving the command, restoring the trace to a checkpoint that was previously generated to describe a snapshot of the trace at a point that is proximal to the indicated line number; and
resuming debugging of the trace at the indicated line number, through the TDB.

13. One or more non-transitory, computer-readable media storing instructions which, when executed by at least one processor, cause the at least one processor to perform operations comprising:
capturing a trace from a production version of a database that operates in a production environment, wherein the trace is a log that indicates a state of the database and of a program executing to access the database, wherein the state is a recording of variables, classes, modules, and functions in a code block;
executing a trace debugger (TDB) in a test environment that is separate from the production environment;
replaying the captured trace in the TDB to debug the trace in a debugging session while the trace is executing in a test version of the database operating in the test environment;
receiving, by the at least one processor, at least one edit to code of the program, the at least one edit made through the TDB;
rebuilding, by the at least one processor, the program, within the debugging session, to incorporate the at least one edit, wherein the rebuilding of the program is incremental to rebuild at least one portion of the program that was altered through the at least one edit; and
resuming, by the at least one processor, debugging of the trace, through the TDB, within the debugging session, at a checkpoint that was previously generated to describe a snapshot of the trace at a point that is proximal to current line number of the program.

14. The one or more non-transitory, computer-readable media of claim 13, wherein:
   the TDB divides the replayed trace into a plurality of code blocks for divided batch execution; and
   the plurality of code blocks include one or more of an indented code block and a database statement block.

15. The one or more non-transitory, computer-readable media of claim 14, the operations further comprising:
   checking for the one or more indented code blocks in the plurality of code blocks.

16. The one or more non-transitory, computer-readable media of claim 14, the operations further comprising:
   storing for each of the plurality of code blocks, information for the respective code block in a global dictionary that is accessible by the TDB, wherein the stored information includes one or more of a global variable, parameter, function definition, and assignment that is present in the respective code block.

17. The one or more non-transitory, computer-readable media of claim 13, the operations further comprising:
   receiving a command that is submitted through the TDB to request reverse debugging of the trace, the command indicating a line number in the program that is prior to a current line number;
   in response to receiving the command, restoring the trace to a checkpoint that was previously generated to describe a snapshot of the trace at a point that is proximal to the indicated line number; and
   resuming debugging of the trace at the indicated line number, through the TDB.

\* \* \* \* \*